US012768942B2

(12) United States Patent
Bronstein et al.

(10) Patent No.: US 12,768,942 B2
(45) Date of Patent: Oct. 20, 2026

(54) METHOD AND SYSTEM FOR TRAINING A MACHINE LEARNING PROCEDURE TO ANALYZE A RADAR SIGNAL

(71) Applicant: Technion Research & Development Foundation Limited, Haifa (IL)

(72) Inventors: Alexander Bronstein, Haifa (IL); Tomer Weiss, Haifa (IL); Nissim Peretz, Haifa (IL); Sanketh Vedula, Haifa (IL); Arie Feuer, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 260 days.

(21) Appl. No.: 18/376,465

(22) Filed: Oct. 4, 2023

(65) Prior Publication Data

US 2024/0125898 A1 Apr. 18, 2024

Related U.S. Application Data

(60) Provisional application No. 63/412,906, filed on Oct. 4, 2022.

(51) Int. Cl.
*G01S 7/40* (2006.01)
*G01S 7/41* (2006.01)

(52) U.S. Cl.
CPC .............. *G01S 7/4021* (2013.01); *G01S 7/40* (2013.01); *G01S 7/417* (2013.01)

(58) Field of Classification Search
CPC ................................ G01S 7/4021; G01S 7/40
See application file for complete search history.

(56) References Cited

U.S. PATENT DOCUMENTS

2009/0268952 A1 10/2009 Schaffer
2017/0143312 A1 5/2017 Hedlund
2018/0293453 A1* 10/2018 Viswanathan ......... G06V 10/40
2020/0355817 A1* 11/2020 Gillian .................. G01S 7/4026
2021/0256700 A1 8/2021 Senouf et al.

FOREIGN PATENT DOCUMENTS

WO WO 2018/048507 3/2018
WO WO 2020/035864 2/2020

OTHER PUBLICATIONS

International Search Report and the Written Opinion Dated Nov. 7, 2019 From the International Searching Authority Re. Application No. PCT/IL2019/050915. (10 Pages).
Notice of Allowance Dated Jun. 23, 2021 From the US Patent and Trademark Office Re. U.S. Appl. No. 17/268,605. (11 Pages).

(Continued)

*Primary Examiner* — Timothy A Brainard
*Assistant Examiner* — Helena H Seraydaryan

(57) ABSTRACT

A method of designing a radar, comprises receiving data pertaining to a set of reflected signals received from a distribution of objects by a respective set of receiving antennas at a respective set of locations, and feeding the data and the locations as training data to a machine learning procedure. The machine learning procedure calculates, simultaneously, a set of learned antenna locations and a set of learned parameters associating the signals with the objects, thereby providing a trained machine learning procedure parametrized by the set of learned parameters.

20 Claims, 9 Drawing Sheets

(56) References Cited

OTHER PUBLICATIONS

Donoho "Compressed sensing," IEEE Transactions on Information Theory, vol. 52(4): 1289-1306, Apr. 3, 2006.
Elbir et al. "Deep-Sparse Array Cognitive Radar", in 2019 13th International Conference on Sampling Theory and Applications (SampTA). IEEE, Mar. 12, 2020.
Elbir et al. "Sparse Array Selection Across Arbitrary Sensor Geometries With Deep Transfer Learning", IEEE Transactions on Cognitive Communications and Networking, 7(1): Jun. 4, 2020.
Fishler et al. "Mimo radar: an idea whose time has come," in Proceedings of the 2004 IEEE Radar Conference (IEEE Cat. No.04CH37509), Jul. 26, 2004.
Guan et al. "High Resolution Millimeter Wave Imaging For Self-Driving Cars", Computer Vision and Pattern Recognition, arXiv preprint arXiv:1912.09579, 14 pages, 13 figures, 2019.
Haim et al. "Depth Estimation From a Single Image Using Deep Learned Phase Coded Mask", IEEE Transactions on Computational Imaging, 4(3): 298-310, Jun. 20, 2018.
Jang et al. "Categorical Reparameterization with Gumbel-Softmax", Statistics, Machine Learning (stat.ML); arXiv preprint arXiv:1611.01144, 2016.
Kingma et al. "Adam: A Method for Stochastic Optimization", Computer Science > Machine Learning, arXiv:1412.6980 [cs.LG], 2017.
Rabinovich et al. "Multi-Line Acquisition With Minimum Variance Beamforming in Medical Ultrasound Imaging", IEEE Transactions on Ultrasonic, Ferroelectrics, and Frequency Control, 60(12): 2521-2531, Dec. 2013.
Ronneberger et al. "U-Net: Convolutional Networks for Biomedical Image Segmentation" in Medical Image Computing and Computer-Assisted Intervention—MICCAI 2015 pp. 234-241, 2015.
Rossi et al. "Spatial Compressive Sensing for MIMO Radar", IEEE Transactions on Signal Processing, 62(2): 419-430, Nov. 7, 2013.
Stephan et al. "Radar-based Human Target Detection using Deep Residual U-Net for Smart Home Applications ", in 18th IEEE International Conference On Machine Learning And Applications (ICMLA), Feb. 17, 2020.
Strohmer et al. "Sparse MIMO Radar with Random Sensor Arrays and Kerdock Codes", in Proceedings of the 10th International Conference on Sampling Theory and Applications, 517-520, 2013.
Strohmer et al. "Analysis of Sparse Mimo Radar," Applied and Computational Harmonic Analysis, 37(3): 361-388, Nov. 2014.
Vedula et al. "Learning Beamforming in Ultrasound Imaging," Proceedings of The 2nd International Conference on Medical Imaging with Deep Learning, (MIDL), PMLR 102:493-511, 2019.
Wang et al. "Generating High Quality Visible Images from SAR Images Using CNNs" in IEEE Radar Conference (RadarConf), Jun. 11, 2018.
Wang et al. "Relaxed Multivariate Bernoulli Distribution and its Applications to Deep Generative Models," in Proceedings of the 36th Conference on Uncertainty in Artificial Intelligence (UAI), PMLR vol. 124: 500-509, 2020.
Weiss et al. "PILOT: Physics-Informed Learned Optimized Trajectories for Accelerated MRI", Journal of Machine Learning for Biomedical Imaging, (MELBA), 6: 1-23, Mar. 2021.
Weiss et al. "Towards Learned Optimal q-Space Sampling in Diffusion MRI", Proc. Computational Diffusion MRI, MICCAI, 13-28, Sep. 30, 2021.
Weiss et al. "Joint Learning of Cartesian under Sampling Andre Construction for Accelerated MRI," in International Conference on Acoustics, Speech and Signal Processing (ICASSP), IEEE, Apr. 9, 2020.
Xie et al. "?-Net: Deep-Learning Schemes for Ground Penetrating Radar Data Inversion", Journal of Environmental and Engineering Geophysics (2020) 25 (2): 287-292, Jun. 2020.
Xie et al. "Reparameterizable subset sampling via continuous relaxations" , Computer Science > Machine Learning, ar Xiv preprint arXiv:1901.10517, 2019.
Yu et al. "Mimo Radar Using Compressive Sampling," IEEE Journal of Selected Topics in Signal Processing, vol. 4(1): 146-163, Jan. 19, 2010.
Zbontar et al. "fastMRI: An Open Dataset and Benchmarks for Accelerated MRI", Computer Vision and Pattern Recognition (cs. CV), arXiv preprint arXiv:1811.08839, 35 pages, 10 figures, 2018.

* cited by examiner

FIG. 3A
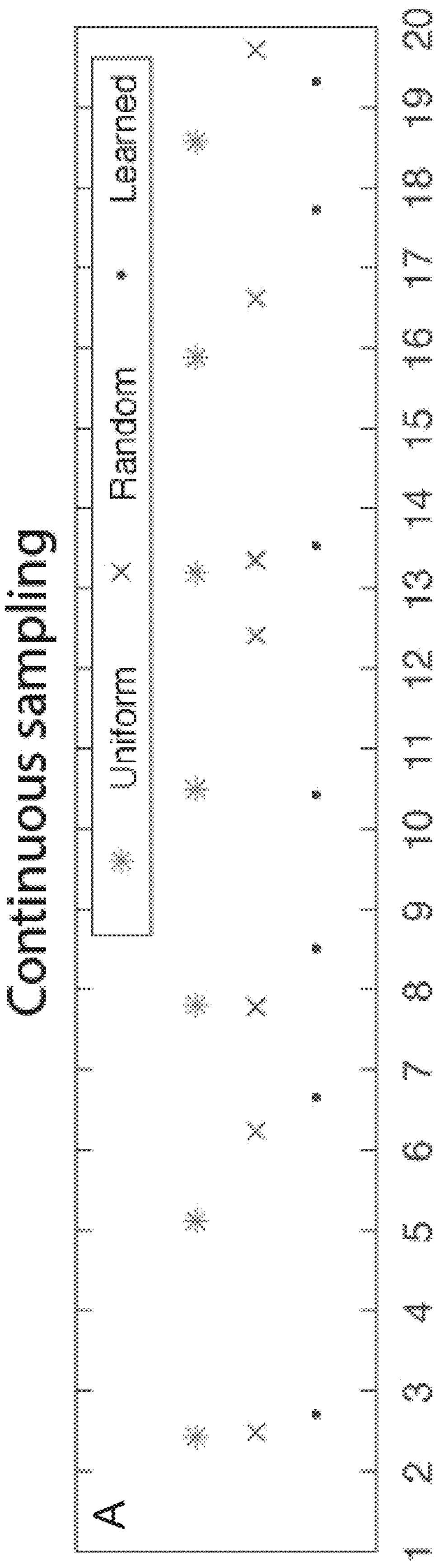
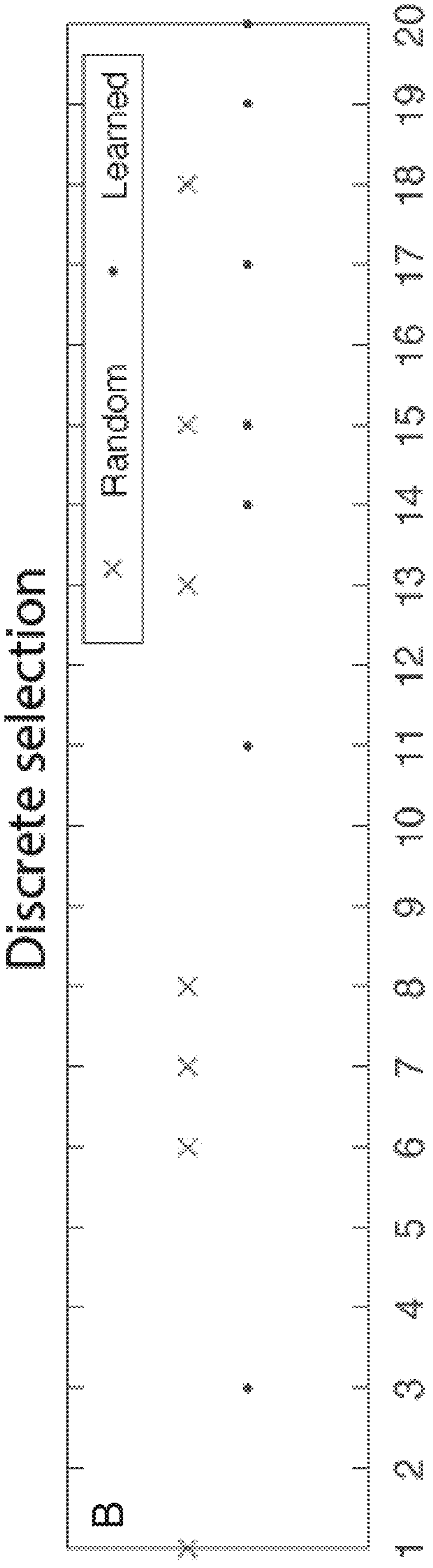
FIG. 3B

METHOD AND SYSTEM FOR TRAINING A MACHINE LEARNING PROCEDURE TO ANALYZE A RADAR SIGNAL

RELATED APPLICATION(S)

This application claims the benefit of priority under 35 USC § 119(e) of U.S. Provisional Patent Application No. 63/412,906 filed on Oct. 4, 2022, the contents of which are all incorporated by reference as if fully set forth herein in their entirety.

FIELD AND BACKGROUND OF THE INVENTION

The present invention, in some embodiments thereof, relates to radar detection and, more particularly, but not exclusively, to a method and system for training a machine learning procedure to analyze a radar signal.

Millimeter wave multiple-input multiple-output (MIMO) radar [1] is a technology that provides accurate range, velocity and direction of arrival (DOA) estimation at relatively long distances. MIMO radar can penetrate much denser fog and rain compared to the optical counterparts.

Conventionally, sampling and processing radar signals are performed at Nyquist rates. Also known is use of compressed sensing (CS) with sub-Nyquist sample rate for reconstructing the underlying signal [2]. CS was used in MIMO radars to increase resolution, and reduce processing time and the number of antennas [3-6]. For signal reconstruction, convolutional neural networks (CNNs) have been used to generate images from radar signals [7, 8]. In the context of cognitive radars, machine learning techniques were employed to choose sparse subarray of sensors [9, 10].

Additional background art includes Refs. [11-15].

SUMMARY OF THE INVENTION

According to some embodiments of the invention the present invention there is provided a method of designing a radar. The method comprises: receiving data pertaining to a set of reflected signals received from a distribution of objects by a respective set of receiving antennas at a respective set of locations, and feeding the data and the locations as training data to a machine learning procedure which calculates, simultaneously, a set ψ of learned antenna locations and a set θ of learned parameters associating the signals with the objects, to provide a trained machine learning procedure parametrized by the set θ of learned parameters. The method can then store in a computer readable medium the set ψ of learned antenna locations separately from the trained machine learning procedure.

According to some embodiments of the invention a number of learned antenna locations is less than a number of the receiving antennas.

According to some embodiments of the invention the set ψ of learned antenna locations is a subset of the respective set of locations.

According to some embodiments of the invention the set ψ of learned antenna locations comprises at least one learned antenna location that is not a member of the respective set of locations.

According to some embodiments of the invention the set θ of learned parameters comprises parameters employed by the trained machine learning procedure to reconstruct a scene containing the objects.

According to some embodiments of the invention the set θ of learned parameters comprises parameters employed by the trained machine learning procedure to reconstruct an image of a scene containing the objects.

According to some embodiments of the invention the set θ of learned parameters comprises parameters employed by the trained machine learning procedure to detect presence of the objects.

According to some embodiments of the invention the set θ of learned parameters comprises parameters employed by the trained machine learning procedure to determine locations of the objects.

According to some embodiments of the invention the set θ of learned parameters comprises parameters employed by the trained machine learning procedure to segment of a scene containing the objects.

According to some embodiments of the invention the machine learning procedure comprises a sub-sampling layer, wherein the learned antenna locations are parameters of the sub-sampling layer, and wherein the trained machine learning procedure is devoid of the sub-sampling layer.

According to some embodiments of the invention the machine learning procedure comprises a beamforming layer having fixed parameters.

According to some embodiments of the invention the method comprises applying the machine learning procedure also to learn parameters of the beamforming layer.

According to some embodiments of the invention the method comprises training the machine learning procedure to learn at least one acquisition parameter. According to some embodiments of the invention the acquisition parameter is selected from the group consisting of transmitted waveform modulation, and Doppler shift acquisition.

The acquisition parameter(s) are optionally and preferably learned independently of the antenna location. For example, instead of multiple transmissions at a single frequency, a waveform combining several such frequencies can be transmitted, where the combination weights of the frequencies can be a learnable set of parameters. When Doppler acquisition is employed, the method can transmit a chirp waveform, and the parameters of the chirp can be learned. Also contemplated, are embodiments in which two or more signal acquisitions are executed (e.g., acquiring different image frames of the same scene), where each signal is acquired using different acquisition settings which provide tradeoffs for different performance parameters (e.g., resolution, ambiguity, SNR, and the like). The method of the present embodiments can then use the multiple signal acquisitions to reconstruct a single image frame.

According to some embodiments of the present invention there is provided a method of constructing a radar. The method comprises executing the method as delineated above and optionally and preferably as further detailed below, and constructing an array of receiving antennas at the set ψ of learned antenna locations, and an array of transmitting antennas at predetermined locations, thereby constructing the radar.

According to some embodiments of the present invention there is provided a method of analyzing a scene. The method comprises receiving signals from the scene using a radar designed as delineated above and optionally and preferably as further detailed below, feeding the signals to the trained machine learning procedure, and receiving from the trained machine learning procedure output pertaining to an association of the signals with objects in the scene.

According to some embodiments of the present invention there is provided a method of designing a radar. The method comprises receiving data pertaining to reflected signals received from a distribution of objects in response to signals transmitted by a set of transmitting antennas at a respective set of locations, and feeding the data and the locations as training data to a machine learning procedure which calculates, simultaneously, a set $\psi$ of learned antenna locations and a set $\theta$ of learned parameters associating the signals with the objects, to provide a trained machine learning procedure parametrized by the set $\psi$ of learned parameters. The method can then store in a computer readable medium the set $\psi$ of learned antenna locations separately from the trained machine learning procedure.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A and 3B show comparison between random, uniform and learned antenna locations as obtained in experiments performed according to some embodiments of the present invention for discrete selection and continuous sampling scenarios.

DESCRIPTION OF SPECIFIC EMBODIMENTS OF THE INVENTION

Figure 1:
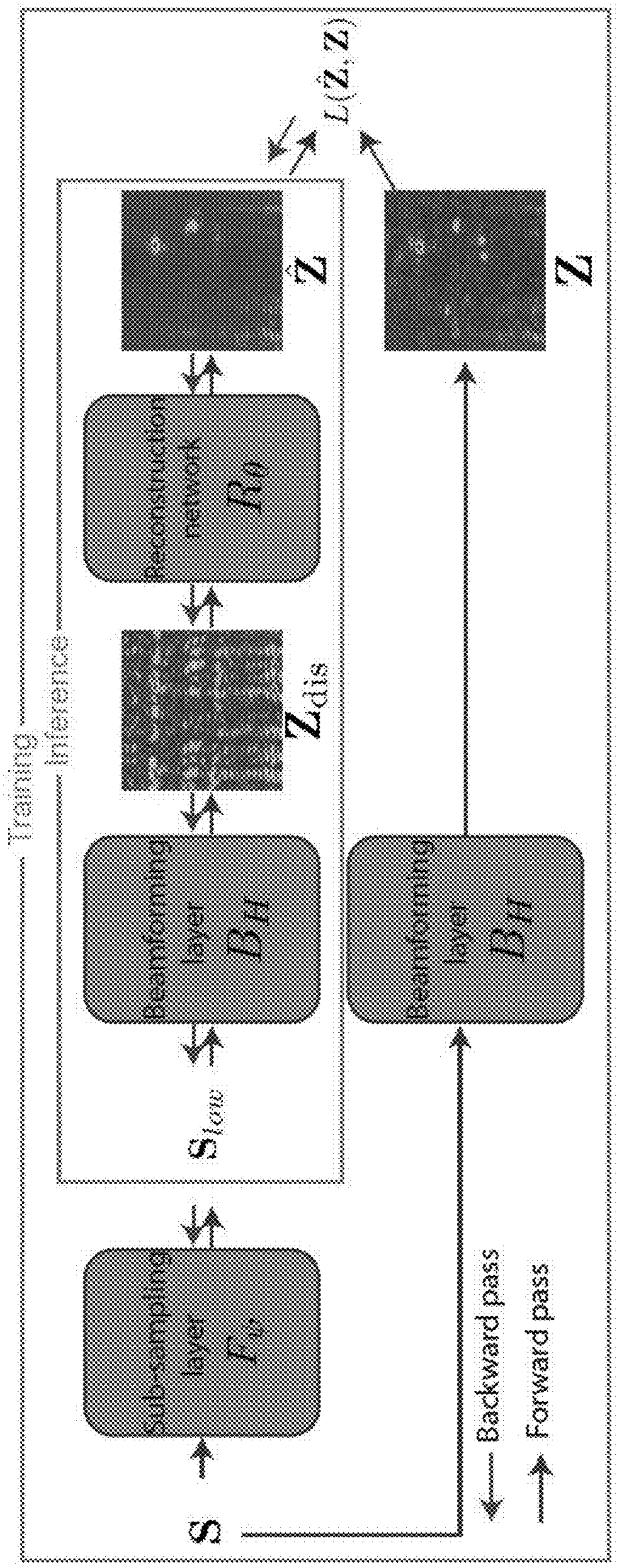
FIG. 1 is a schematic illustration showing a data-flow pipeline for a machine learning procedure according to some embodiments of the present invention. During training, the forward model parametrized by $\psi$(antenna locations) is optimized together with reconstruction model parametrized by $\theta$. At inference, the optimized antenna locations ($\psi$) are fixed and programmed into the hardware to be used during acquisition.

The present invention, in some embodiments thereof, relates to radar detection and, more particularly, but not exclusively, to a method and system for training a machine learning procedure to analyze a radar signal.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 5:
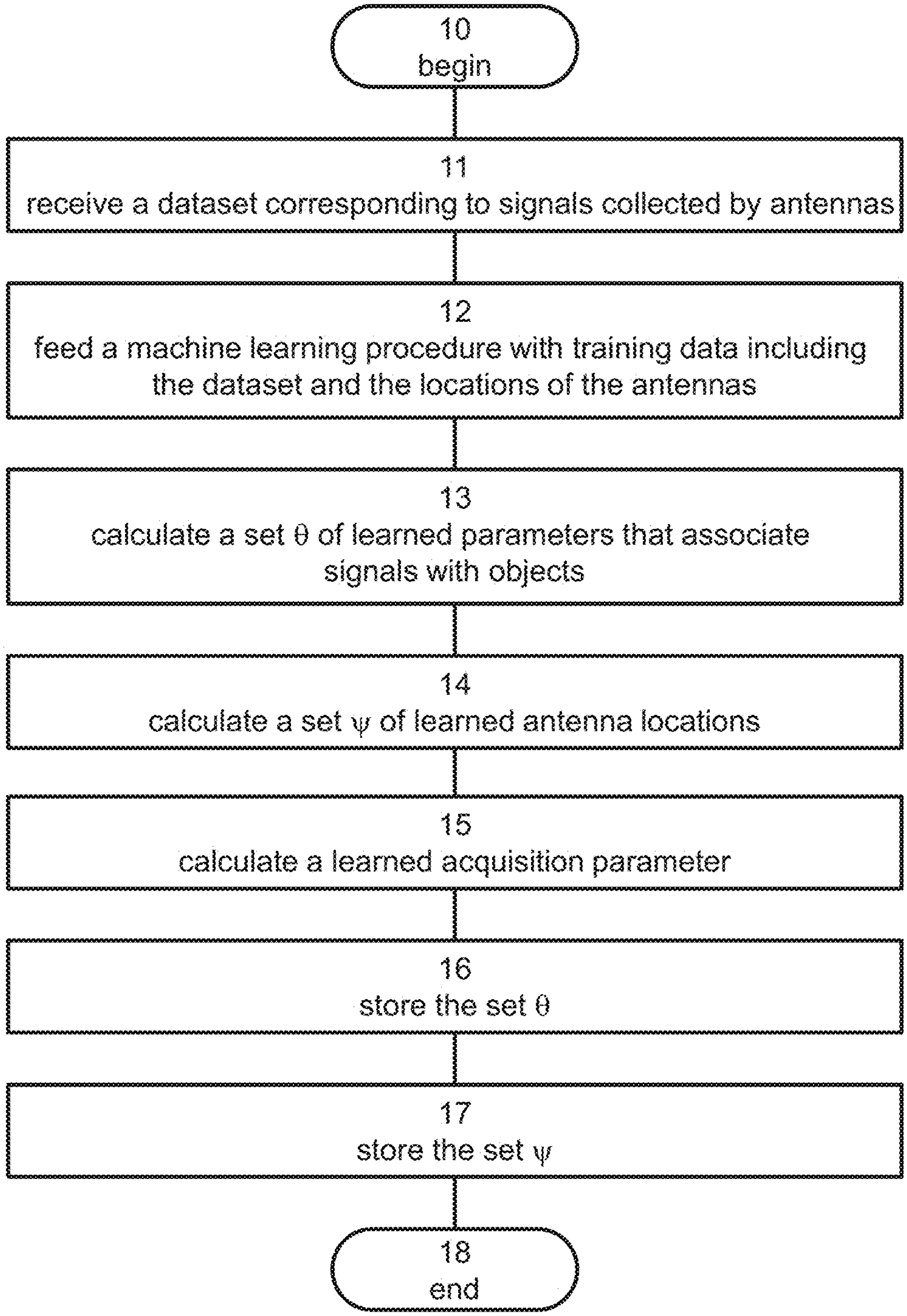
FIG. 5 is a flowchart diagram of a method suitable for designing a radar, according to some embodiments of the present invention.

Referring now to the drawings, FIG. 5 is a flowchart diagram of a method suitable for designing a radar, according to some embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

At least part of the operations described herein can be implemented by a data processing system, e.g., a dedicated circuitry or a general purpose processor, configured for executing the operations described below. At least part of the operations can be implemented by a cloud-computing facility at a remote location.

Computer programs implementing the method of the present embodiments can commonly be distributed to users by a communication network or on a distribution medium such as, but not limited to, a floppy disk, a CD-ROM, a flash memory device and a portable hard drive. From the communication network or distribution medium, the computer programs can be copied to a hard disk or a similar intermediate storage medium. The computer programs can be run by loading the code instructions either from their distribution medium or their intermediate storage medium into the execution memory of the computer, configuring the computer to act in accordance with the method of this invention. During operation, the computer can store in a memory data structures or values obtained by intermediate calculations and pull these data structures or values for use in subsequent operation. All these operations are well-known to those skilled in the art of computer systems.

Processing operations described herein may be performed by means of processer circuit, such as a DSP, microcontroller, FPGA, ASIC, etc., or any other conventional and/or dedicated computing system.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

The method begins at 10 and optionally and preferably continues to 11 at which a dataset is received. The dataset typically includes data pertaining to a set S of echo signals reflected off a distribution of objects by a respective set of receiving antennas at a respective set of antenna locations.

The signals can be collected using a test MIMO radar that includes the antennas at locations and the receives the signals S from the objects, where the locations (range and azimuth) of the objects in the distribution are optionally and preferably predetermined. Also contemplated are embodiments in which prohibited locations of the objects are known. For example, a test MIMO radar can collect signals from vehicles on one or more roads, in which case locations outside the road(s) are considered prohibited. When prohibited locations are known, it is not necessary to have the objects distributed at predetermined locations. Further contemplated, are embodiments in which the prohibited locations are known and the objects are distributed at predetermined locations.

The method continues to 12 at which the dataset and a set of antenna locations are fed as training data to an untrained machine learning procedure. Optionally, but not necessarily, the training data also include the locations of the objects and/or the prohibited locations.

The present embodiments contemplate more than one mode of execution. In some embodiments of the present invention the antenna locations that are used in the training data are the locations of the antennas that receive the echo signals. In some embodiments of the present invention the antenna locations that are used in the training data are the locations of the antennas that transmit signals to the objects from which the echo signals are reflected. In some embodiments of the present invention the antenna locations that are used in the training data are both the locations of the antennas that transmit signals to the distribution of objects and the locations of the antennas that receive the echo signals from the objects.

The set of locations that are used in the training data is denoted $L_A$. Thus, for example, in the mode of operations in which the antenna locations in the training data are the locations of the antennas that receive the echo signals, at each location $I \in L_A$ there is an antenna that receives an echo signal $s \in S$ from one or more objects in the distribution. Similarly, in the mode of operations in which the antenna locations in the training data are the locations of the antennas that transmit signals, at each location $I \in L_A$ there is an antenna that transmits a signal to the distribution of objects.

The locations in $L_A$ need not be absolute locations. Typically the locations are relative to some predetermined reference point. For example, one of the locations in $L_A$ can be defined as a reference point (e.g., location zero) and all other locations can be defined relative to this location.

As used herein the term "machine learning" refers to a procedure embodied as a computer program configured to induce patterns, regularities, or rules from previously collected data to develop an appropriate response to future data, or describe the data in some meaningful way.

Representative examples of machine learning procedures suitable for the present embodiments, include, without limitation, clustering, association rule algorithms, feature evaluation algorithms, subset selection algorithms, support vector machines, classification rules, cost-sensitive classifiers, vote algorithms, stacking algorithms, Bayesian networks, decision trees, neural networks (e.g., fully-connected neural network, convolutional neural network), instance-based algorithms, linear modeling algorithms, k-nearest neighbors (KNN) analysis, ensemble learning algorithms, probabilistic models, graphical models, logistic regression methods (including multinomial logistic regression methods), gradient ascent methods, singular value decomposition methods and principle component analysis.

Preferably, the machine learning procedure comprises an artificial neural network.

Artificial neural networks are a class of algorithms based on a concept of inter-connected "neurons." In a typical neural network, neurons contain data values, each of which affects the value of a connected neuron according to connections with pre-defined strengths, and whether the sum of connections to each particular neuron meets a pre-defined threshold. By determining proper connection strengths and threshold values (a process also referred to as training), a neural network can decode the range information from the input information (for example, the image data itself or some transform, e.g., a complex cepstrum transform, thereof). Oftentimes, these neurons are grouped into layers in order to make connections between groups more obvious and to each computation of values. Each layer of the network may have differing numbers of neurons, and these may or may not be related to particular qualities of the input data.

In one implementation, called a fully-connected neural network, each of the neurons in a particular layer is connected to and provides input value to those in the next layer. These input values are then summed and this sum compared to a bias, or threshold. If the value exceeds the threshold for a particular neuron, that neuron then holds a positive value which can be used as input to neurons in the next layer of neurons. This computation continues through the various layers of the neural network, until it reaches a final layer. At this point, the output of the neural network procedure can be read from the values in the final layer. Unlike fully-connected neural networks, convolutional neural networks operate by associating an array of values with each neuron, rather than a single value. The transformation of a neuron value for the subsequent layer is generalized from multiplication to convolution.

In various exemplary embodiments of the invention the machine learning procedure is a convolutional neural network (CNN). Preferably, the CNN has a U-Net architecture. In such an architecture, there are two distinctive pathways, oftentimes termed an encoding pathway and a decoding pathway. The encoding pathway includes convolutional layers and typically applies down-sampling to capture features and hierarchies in the dataset. The decoding pathway includes transposed convolutional layers and typically applies up-sampling to segment the features captured by the encoding pathway. The two pathways are connected via one or more layers known as the U-part of the CNN. The U-Net architecture also includes one or more elements known as "skip connections" that connect corresponding layers between the two pathways, allowing the decoding pathway to access low-level information in the encoding pathway, and therefore to reconstruct segmented regions. A typical skip connection concatenate the output of one of the encoding pathway's convolutional layers with an up-sampled output of one of the decoding pathway's transposed convolutional layers.

The untrained machine learning procedure is trained according to some embodiments of the present invention by feeding it with the training data. Once the data are fed, the machine learning procedure calculates 13 a set θ of learned parameters that associate the signals with the objects. This provides a trained machine learning procedure that is parameterized by the set θ. The set θ parameterizes the trained machine learning procedure in the sense that the trained machine learning procedure can use the parameters in θ and provide output for other datasets without the need to re-train it. The present embodiments contemplate may types of output for the trained machine learning procedure. In some embodiments of the present invention the output is a reconstruction of an image of a scene containing the objects, in some embodiments of the present invention the output provides a segmentation of a scene containing objects, in some embodiments of the present invention the output provides indication regarding the presence of objects, in some embodiments of the present invention the output provides indication regarding the azimuth to objects, in some embodiments of the present invention the output provides indication regarding range to objects, and in some embodiments of the present invention the output provides indication regarding the location (azimuth and range) to objects.

It is appreciated that for different types of output for which the machine learning procedure is to be trained, different types of learned parameters and/or different parameter values in θ are calculated at 13. Specifically, the set θ can comprise parameters that are employed by trained machine learning procedure to reconstruct an image of a scene containing the objects, or parameters that are employed by trained machine learning procedure to detect presence of objects, or parameters that are employed by trained machine learning procedure to determine azimuth to objects, parameters that are employed by trained machine learning procedure to determine range to objects, or parameters that are employed by trained machine learning procedure to determine locations of objects, or parameters that are employed by trained machine learning procedure to segment of a scene containing objects.

A particular feature of the training data of the present embodiments is that aside for the dataset it also includes the locations of the antennas. This allows the machine learning procedure to simultaneously calculate, not only the set θ, but also a set ψ of learned antenna locations. The calculation of the set ψ is represented in FIG. 5 by block 14. Similarly to the locations in $L_A$, the learned locations in ψ need not be absolute locations. The learned locations can be relative to some predetermined reference point. For example, one of the locations in ψ can be defined as a reference point (e.g., location zero) and all other locations can be defined relative to this location.

The set ψ is optionally and preferably calculated by means of a sub-sampling layer of the untrained machine learning, wherein the learned antenna locations in the set ψ are parameters of the sub-sampling layer. Preferably, the sub-sampling layer receives, as input, the set S of signals, preferably in its entirety, and provides, as output, an emulation $S_{low}$ containing sub-sampled versions of the signals in S, wherein the emulation $S_{low}$ is a function of S and is parameterized by the set ψ. The training process selects the values of the elements in ψ in order to reach an extremum of a predetermined objective function that defines the training.

The goal of the training is therefore twofold: it selects the set ψ which provides locations at which antenna can be located in order to receive signals from objects to be detected by the radar, and it also selects the set θ which allows the trained machine learning procedure to be applied, without re-training, to a dataset collected by antennas that are positioned at the locations in the set ψ. The locations in ψ can include both locations at which the receiving antennas of the radar are to be positioned and locations at which the transmitting antennas of the radar are to be positioned.

Typically, but not necessarily, the number of learned antenna locations ψ is less than the number of the receiving antennas from which that dataset of the training data was obtained. In the simplest case, the machine learning procedure selects, during the training, a subset of the locations in the set $L_A$. In other embodiments, the set ψ of learned antenna locations comprises one or more learned antenna location that is not a member of the set $L_A$. For example, the set ψ can include one or more locations between two successive elements of $L_A$.

In some embodiments of the present invention the untrained machine learning procedure comprises one or more beamforming layers, having fixed parameters. The fixed parameters can optionally and preferably be provided as a matrix, referred to below as steering matrix H. The matrix H can include parameters that define the properties of the individual signals that are received and/or transmitted by the antennas. For example, the steering matrix H can represent a set of phase-delays for each antenna, e.g., a row of the steering matrix H can define a steering direction represented by a set of delays of the antennas. The same readout of the antennas can be connected to multiple delays, representing multiple steering directions.

A first beamforming layer can multiply the output, $S_{low}$, of the sub-sampling layer by the matrix H. A second beamforming layer can multiply the set S of the training data by the matrix H. The result of each of the multiplications can be averaged over the number of antennas, and an inverse FFT can then be applied over the ranges to the objects, keeping their azimuths fixed. Other frequency schemes can also be applied top the result of the multiplication. These frequency schemes can be applied as alternatives or supplements to the aforementioned FFT scheme.

The output of each beamforming layer is a range-azimuth map. Since the first beamforming layer receives the output of the sub-sampling layer, it provides a distorted map, and is therefore denoted $Z_{dis}$. The second beamforming layer (that receives the set S of the training data) provides an undistorted map, and is denoted Z.

The output, $Z_{dis}$, of the first beamforming layer is preferably passed as input to one or more layers that form a reconstruction subnetwork $R_\theta$ and that learn the set θ of parameters. The output $\hat{Z}$ of the reconstruction subnetwork is selected based on the application form which the trained machine learning procedure is to be applied. Specifically, the output $\hat{Z}$ can be a reconstruction of an image of the scene containing the objects, or a layer that provides indication regarding the presence of objects, or a layer that provides azimuths to the objects, or a layer that provides ranges to objects, or a layer that provides locations of the objects, or a segmented version of the scene containing the objects.

The objective function that defines the training typically comprises a discrepancy between the output $\hat{Z}$ of the reconstruction subnetwork $R_\theta$ and the output Z of the second beamforming layer. It is appreciated that when $\hat{Z}$ and Z are of different dimensions, the calculation of the discrepancy may include a dimensional reduction.

The sub-sampling layer and/or the second beamforming layer is preferably employed only during the training process. Once the sets ψ and θ are calculated, the machine learning procedure becomes the trained machine learning procedure which is optionally and preferably devoid of the sub-sampling layer and/or the second beamforming layer.

In some embodiments of the present invention the method proceeds to 15 at which the training machine learning procedure is trained to learn one or more acquisition parameters, including, without limitation, transmitted waveform modulation, Doppler shift acquisition, and the like. The ordinarily skilled person, provided by the detailed described herein, would know how to adjust the machine learning procedure to learn parameters other than the sets ψ and θ. For example, learnable acquisition parameters can be added to one or more of the layers of the machine learning procedure described above. As a representative example, the aforementioned reconstruction subnetwork $R_\theta$ can be replaced with another reconstruction subnetwork $R_{\theta\phi}$ where ϕ is a learnable acquisition parameter. Alternatively or additionally, one or more layers that learn the acquisition parameter(s) ϕ can be used in addition to the layers described above. When the machine learning procedure learns additional parameters, the training data optionally and preferably also include training values of these additional parameters that are used while collecting the dataset received at 11.

Once the machine learning procedure is trained the method proceeds to 16 at which the set θ of learned parameter is stored in a computer-readable memory medium, and to 17 at which the set ψ of learned locations is stored in a computer-readable memory medium. The sets θ and ψ are preferably stored separately from each other, to allow independent retrieval of these sets from the memory. Typically, the set ψ is retrieved when it is desired to construct a radar. In this case, a radar antenna is positioned at each of the locations in the set ψ. The set θ characterizes the trained machine learning procedure, and is therefore retrieved when it is desired to apply the trained machine learning procedure to a dataset obtained from signals received by the antennas of the constructed a radar.

In the mode of operation in which the set $L_A$ includes only locations of antennas that receive the echo signals, the learned locations ψ are preferably locations at which the receiving antennas of the radar are to be positioned. In this case, the transmitting antennas are optionally and preferably positioned at predetermined locations that are not learned by the machine learning procedure. In the mode of operation in which the set $L_A$ includes only locations of antennas that transmit the signals to the distribution of objects, the learned locations ψ are preferably locations at which the transmitting antennas of the radar are to be positioned. In this case, the receiving antennas are optionally and preferably positioned at predetermined locations that are not learned by the machine learning procedure. In the mode of operation in which the set $L_A$ includes both locations of antennas that transmit the signals to the distribution of objects and locations of antennas that receive the echo signals, the learned locations ψ are preferably locations at which both the transmitting antennas of the radar are to be positioned.

The method ends at 18.

Figure 6:
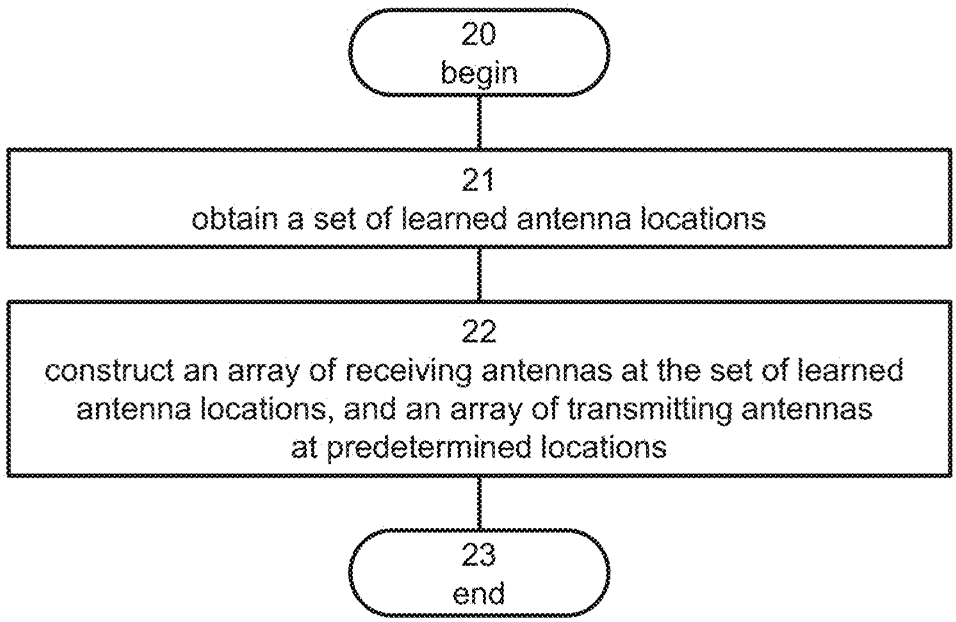
FIG. 6 is a flowchart diagram of a method suitable for constructing a radar, according to some embodiments of the present invention.

FIG. 6 is a flowchart diagram of a method suitable for constructing a radar, according to some embodiments of the present invention. The method begins at 20 and continues to 21 at which a machine learning procedure is trained to provide a set ψ of learned antenna location. This can be done by executing one or more operations of method 10. The method proceeds to 22 at which an array of receiving antennas is constructed at the learned antenna locations, and an array of transmitting antennas is constructed at predetermined locations.

The method ends at 23.

Figure 7:
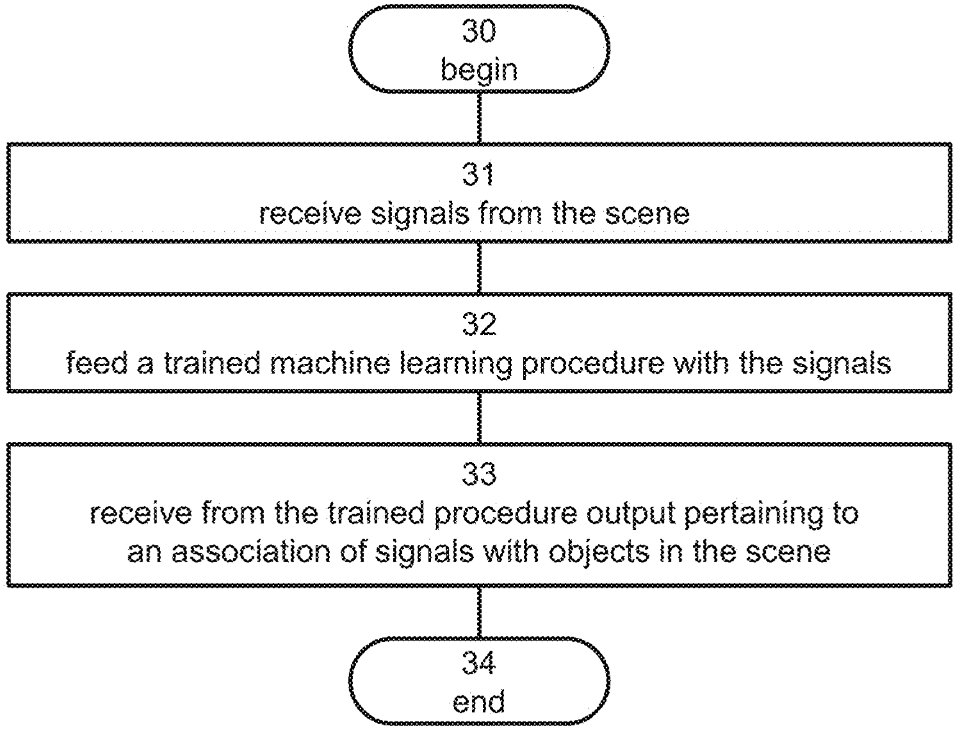
FIG. 7 is a flowchart diagram of a method suitable for analyzing a scene, according to some embodiments of the present invention.

FIG. 7 is a flowchart diagram of a method suitable for analyzing a scene, according to some embodiments of the present invention. The method begins at 30 and continues to 31 at which signals are received from the scene using a radar, which is optionally and preferably designed and constructed be executing selected operations of methods 10 and 20 above. The method proceeds to 32 at which the signals are fed to a trained machine learning procedure. The trained machine learning procedure can be a machine learning procedure trained by executing selected steps of method 10 above. The trained machine learning procedure uses the set θ of learned parameters to associate the signals with objects in the scene. The method proceeds to 33 at which output pertaining to an association of signals with objects in the scene is received from the trained machine learning procedure.

The method ends at 34.

Figure 8:
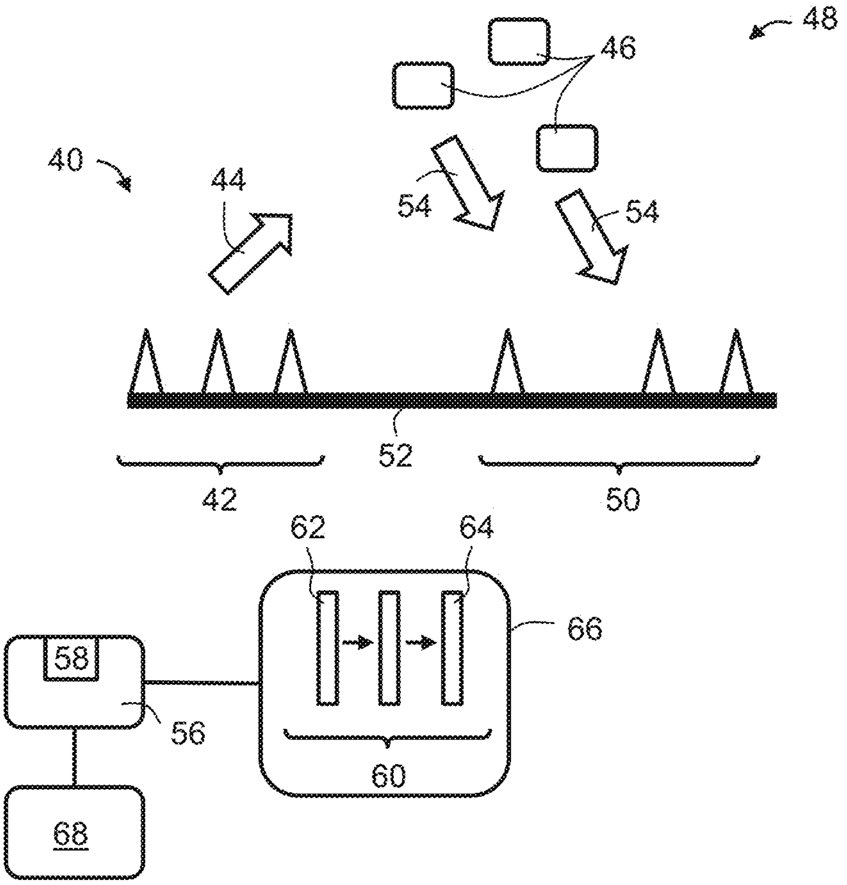
FIG. 8 is a schematic illustration of a radar system, according to some embodiments of the present invention.

FIG. 8 is a schematic illustration of a radar system 40, according to some embodiments of the present invention. Radar system 40 comprises one or more transmitting antennas 42 for transmitting a signal 44 to a distribution of objects 46 in a scene 48. Radar system 40 also comprises a set of receiving antennas 50 distributed non-uniformly over a surface 52 for receiving a respective set of reflected signals 54 from objects 46. When there is more than one transmitting antenna 42 the transmitting antennas 42 are optionally and preferably also distributed non-uniformly over surface 52.

While antennas 42 and 50 are illustrated as distributed linearly, it is to be understood that the distribution of antennas 42 and/or antennas 50 can be one-dimensional, two-dimensional, or three-dimensional. Also contemplated are configurations in which antennas 42 are distributed along a first straight line, and antennas 50 are distributed along a second straight line that is not co-linear with the first straight line.

System 40 also comprises a data processor 56 having a circuit 58 configured to receive data pertaining to reflected signals 54, to feed data to an input layer 62 a trained machine learning procedure 60 which is specific to the non-uniform distribution of the antennas, and to receive from an output layer 64 of trained machine learning procedure 60 a reconstruction of scene 48. The trained machine learning procedure can be stored in a computer readable medium 66. The trained machine learning procedure can be a machine learning procedure that is parametrized by the set θ of learned parameters and that is trained as further detailed hereinabove with respect to method 10. Preferably, medium 66 stores the set θ of learned parameters, and the architecture of procedure 60. The reconstruction of scene 48, as obtained from the output layer 64 of procedure 60, can be displayed by processor 56 on a display device 68.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

MIMO radar is one of the leading depth sensing modalities. However, the usage of multiple receive channels lead to relative high costs and prevent the penetration of MIMOs in many areas such as the automotive industry. Few studies concentrated on designing reduced measurement schemes and image reconstruction schemes for MIMO radars, however these problems have been so far addressed separately. Recent works in optical computational imaging have demonstrated growing success of simultaneous learning-based design of the acquisition and reconstruction schemes, manifesting significant improvement in the reconstruction quality.

This Example describes a method that learns MIMO acquisition parameters in the form of receive (Rx) antenna elements locations jointly with an image neural-network based reconstruction. The Example describes a procedure for training a combined acquisition-reconstruction pipeline end-to-end in a differentiable way. This Example demonstrates the significance of using the learned acquisition parameters with and without the neural-network reconstruction.

Introduction

Imaging technologies are useful in the emerging autonomous vehicle ecosystem. A combination of several long-range (over 100 m) depth sensing modalities is desired for the viability of self-driving cars. RF sensors complement the optical modality in autonomous vehicles. Millimeter wave MIMO radar [1] provides accurate range, velocity and DOA estimation at relatively long distances. MIMO radar can penetrate much denser fog and rain compared to the optical counterparts.

The Inventors found that weakness of this technology is that to achieve sufficient angular resolution, multiple receive channels are required. This requirement currently dictates the high cost of the device. It is desired to maintain high resolution and quality images using a smaller number of receive channels, in order to reduce these technology costs and increase the commercial viability of automotive digital MIMO radars. Standard radar processing samples and processes the received signal at its Nyquist rate. However, recent research showing that by using compressed sensing (CS) [2] even sub-Nyquist sample rate is sufficient for reconstructing the underlying signal. CS was used in MIMO radars to increase resolution [3,4], reduce processing time [5] and to reduce the number of antennas used [6].

For signal reconstruction, convolutional neural networks (CNNs) have been used to generate images from radar signals [7, 8]. In the context of cognitive radars, machine learning techniques were employed to choose sparse subarray of sensors [9, 10].

CS methods use random strategies to select system design parameters. The present Example demonstrates that joint optimization of system design parameters and image reconstruction lead to better performance when compared to conventional random system design strategies. In this Example, the improvement is demonstrated for the case of designing the location of Rx antennas in MIMO radars, but the technique can be also be employed for other designs, such as, but not limited to, the location of Tx antennas.

In the experiments describe below, the learned designs of antenna location design were we compared with the random designs described in [6]. As will be shown below, the Inventors achieved an improvement of 0.88-1:88 dB in peak signal-to-noise ratio (PSNR). In addition to learned system design, this Example describes a CNN-based reconstruction for radar signal reconstruction. The learned designs, together with the CNN-based reconstruction, observe an overall improvement of 4.93-6.36 dB.

The present Example contemplate a design in which the learned locations are discrete and a design in which the learned locations are continuous. For discrete locations, the goal is to learn, given a particular MIMO device, the best subset of Rx antennas for a given environment or end-task. This is equivalent to a selection of a antennas out of a set of antennas. This calculation is therefore discrete. For continuous locations, the goal here is to learn new locations which can be used to design a new device that is optimized given (i) a preselected number of Rx antennas, (ii) a preselected environment (e.g., indoor, outdoor), and (iii) an end-task of interest (e.g., detection, reconstruction, localization, segmentation).

Methods

It is convenient to view the present embodiments as the use of a single neural network combining a forward model (acquisition) and an inverse (reconstruction) model (see FIG. 1 for a schematic depiction). During training, the input to the model is a complex baseband signal obtained from the full set of Rx antennas, denoted as $S\in\mathbb{C}^{Nrange\times Nvirt}$ where $N_{range}$ and $N_{virt}$ are the number of range bins and number of virtual elements, respectively. In MIMO radars, $N_{virt}=N_T N_R$, where $N_T$ and $N_R$ are, respectively, the number of transmit and receive antennas in the full set of antennas [1]. The input is faced by a subsampling layer modeling the data acquisition at the $n_R<N_R$ learned Rx antennas locations, a beamforming layer producing a range-azimuth map, and an end-task model operating in the range-azimuth domain and producing a desired output, such as, but not limited to, a reconstruction output, or a detection output, or localization output, or a segmentation output. For example, when it is desired to produce a reconstruction output, the end-task model generates a reconstructed range-azimuth map.

All the above components are optionally and preferably differentiable with respect to the $n_R$ antennas locations, denoted collectively as ψ, in order to allow training the latter with respect to the performance of the end-task of interest.

Sub-Sampling Layer

The goal of the sub-sampling layer, denoted by $F_\psi:\mathbb{C}^{Nrange\times NT\cdot NR}\rightarrow\mathbb{C}^{Nrange\times NT\cdot nR}$, is to create a set of measurements to be acquired by each one of the Rx antennas according to their locations ψ. Both in discrete and continuous designs the output $S_{low}=F_\psi(S)\in\mathbb{C}^{Nrange\times NT\cdot nR}$ emulates the sub-sampled signal given a fully-sampled signal. However, the procedures for achieving the emulation are different, as will now be explained.

Discrete Learned Locations

In the discrete selection scenario, ψ is parametrized as a vector of size $N_R$. Each entry in this vector is the probability to select the corresponding Rx antenna. To this end, the Gumbel-softmax reparametrization technique [16] can be used to learn the weights ψ, in which case all the channels are treated independently. The Inventors found that in this way the selection of an antenna does not affect the probability of selecting nearby antennas, whereas typically the signals received at neighboring antennas are likely to contain similar information. The Inventors have therefore used the multi-variate analogue of the Gumbel-softmax technique that learns also a covariance parameter to represent the correlation between the selection probability of the different antennas. Further details of this technique is described in Appendix A. Note that at inference time, the antennas with the top $n_R$ weights are selected.

Continuous Learned Locations

In the continuous learning scenario ψ is parametrized as a vector of size $n_R$. Each entry in this vector is the coordinate of an antenna, where the distance between two consecutive antennas is the unit of measure (e.g., $\psi_2=3.5$ means that the location of the 2nd antenna is exactly between the 3rd and 4th antennas of the original device.

Emulating the signal of this new location can be achieved via linearly interpolating the signals received at the two closest antennas. The Inventors observed that linear interpolation reduces the noise differently as function of the learned coordinate, and that this may lead the optimization to be stuck at local minima between every two antennas. To overcome this, the Inventors added a second acquisition of the same scene and interpolated between the two temporally consecutive acquisitions in such as to provide a constant noise reduction as function of the learned coordinate. Further details of this technique is described in Appendix B.

Beamforming Layer

The beamforming, denoted by $B_H$, was of the delay-and-sum type using a predefined steering matrix H. The steering matrix represents the set of phase-delays at each virtual antenna element. The beamforming was performed by multiplying $S_{low}$ and H taking the mean over the virtual elements dimension followed by an inverse FFT along the range dimension and outputs the magnitude of the result. The result was a (distorted) Range-Azimuth map, $Z_{dis}=B_H(S_{low})$.

Task Model

The goal of the task model was to extract the representation of the distorted Range-Azimuth map $Z_{dis}$ that contributes the most to the performance of the end-task (e.g., reconstruction, localization or segmentation). At training, the task specific performance was quantified by a loss function, described below. The model is denoted by $\hat{Z}=R_\theta(Z_{dis})$, with θ representing its learnable parameters. The input to the network was the distorted Range-Azimuth map, $Z_{dis}$, while the type of output was selected according to the task of interest. For example, in reconstruction, the output was a Range-Azimuth map, while in segmentation it was a mask representing the segments of the observed scene.

In the Example, the task model was implemented using a multi-resolution encoder-decoder network with symmetric skip connections, also known as the U-Net architecture [18]. U-Net has been widely-used in computer vision tasks such as reconstruction [19] and segmentation [18] and also in radar applications [20, 21]. However, this should not be considered as limiting, since other implementations for the task model can be used.

Loss Function and Training

The training was performed by simultaneously learning the antennas locations ψ and the parameters of the task model θ. The aim of the loss was to measure how well the specific end task is performed. For the reconstruction task described herein, the $L_2$ norm was employed to measure the discrepancy between the model output image $\hat{Z}$ and the ground-truth image $Z=B_H(S)$, derived by beamforming the measurement acquired with the full set of Rx antennas. In this case, the loss is:

$$L=\|\hat{Z}-Z\|_2.$$

Similarly, for any other end-task (e.g., detection, tracking), the discrepancy between the model output image and the relevant ground truth can be measured. The training was performed by solving the optimization problem $$\min_{\omega,\theta}\sum_{s,z}\ell(R_\theta(B_H(F_\psi(S))),\,Z), \quad \text{(EQ. 1)}$$

where the loss was summed over a training set comprising the pairs of fully sampled data S and the corresponding ground truth output Z.

EXPERIMENTS AND DISCUSSION

Experimental Settings

A dataset was acquired using IMAGEVK-74 4D millimeter wave imaging kit available from minicircuits, USA. The kit includes 20 Tx and 20 Rx on-board antennas that can be configured to transmit and receive signals anywhere within the 62 to 69 GHz range. The dataset was acquired using the full set of antennas $N_T=N_R=20$ and $N_{range}=75$ range bins. The dataset was acquired by collecting signals from metal objects randomly positioned in various DOA angles, using a uniform linear virtual array of 400 virtual elements. The training and test sets comprised 2700 and 300 acquisitions, respectively. The reconstructed Range-Azimuth map was compared to the Range-Azimuth map obtained using the full set of channels. For quantitative evaluation, the PSNR and structural-similarity measure (SSIM) were used. In all the experiments, learned antennas location were compared to random Rx antenna locations over the entire test set. To enable fair comparison, both in the discrete selection and continuous sampling cases the same noise reduction was used (see Appendix B). For the random selections, 10 random selections were evaluated and the one with the best performance was used. In all the experiments, the Adam [22] optimizer was used with learning rate of 0.001 and 200 epochs.

Results

In both the discrete selection and continuous sampling scenarios, superior performance of the learned Rx antenna locations were observed. Tables 1 and 2, below, summarize the quantitative results for different amount of Rx channels for the discrete scenario (Table 1) and the continuous scenario (Table 2).

TABLE 1

| | Antenna | Without reconstruction | | With reconstruction | |
|---|---|---|---|---|---|
| $n_R$ | Locations | PSNR | SSIM | PSNR | SSIM |
| 5 | Random | 22.68 ± 0.67 | 0.184 ± 0.014 | 27.16 ± 0.50 | 0.450 ± 0.017 |
| | Learned | 25.26 ± 0.77 | 0.332 ± 0.017 | 28.39 ± 0.67 | 0.578 ± 0.015 |
| 7 | Random | 23.77 ± 0.74 | 0.191 ± 0.017 | 28.73 ± 0.58 | 0.579 ± 0.021 |
| | Learned | 25.84 ± 0.79 | 0.339 ± 0.023 | 29.63 ± 0.53 | 0.640 ± 0.013 |
| 10 | Random | 24.87 ± 0.75 | 0.211 ± 0.023 | 29.85 ± 0.60 | 0.619 ± 0.018 |
| | Learned | 27.67 ± 0.78 | 0.493 ± 0.023 | 31.23 ± 0.65 | 0.723 ± 0.012 |

TABLE 2

| | Antenna | Without reconstruction | | With reconstruction | |
|---|---|---|---|---|---|
| $n_R$ | Locations | PSNR | SSIM | PSNR | SSIM |
| 5 | Random | 22.57 ± 0.71 | 0.185 ± 0.014 | 27.32 ± 0.61 | 0.507 ± 0.017 |
| | Uniform | 22.20 ± 0.63 | 0.161 ± 0.017 | 27.73 ± 0.71 | 0.494 ± 0.021 |
| | Learned | 23.25 ± 0.61 | 0.178 ± 0.013 | 28.61 ± 0.80 | 0.584 ± 0.018 |
| 7 | Random | 23.75 ± 0.66 | 0.179 ± 0.015 | 28.40 ± 0.91 | 0.575 ± 0.022 |
| | Uniform | 23.48 ± 0.63 | 0.183 ± 0.013 | 28.14 ± 0.88 | 0.532 ± 0.028 |
| | Learned | 24.07 ± 0.62 | 0.212 ± 0.012 | 29.70 ± 0.74 | 0.647 ± 0.019 |
| 10 | Random | 26.24 ± 0.72 | 0.378 ± 0.018 | 29.29 ± 0.90 | 0.631 ± 0.020 |
| | Uniform | 26.83 ± 0.85 | 0.445 ± 0.023 | 28.99 ± 0.71 | 0.622 ± 0.016 |
| | Learned | 27.86 ± 0.83 | 0.469 ± 0.023 | 31.17 ± 0.69 | 0.747 ± 0.015 |

The final image quality is affected by the neural network reconstruction and the antenna location learning. Neural network reconstruction leads to significant improvement of 2.16-5.53 dB in PSNR and 0.177-0.435 SSIM points. Antenna location learning leads to an additional improvement of 0.32-2.58 dB in PSNR and 0.039-0.282 SSIM points without reconstruction and 0.88-1.88 dB in PSNR and 0.061-0.128 SSIM points with reconstruction.

The total improvement was 4.93-6.36 dB in PSNR and 0.364-0.512 SSIM points. Although the discrete optimization domain is a subset of the continuous domain, it is observed that in some cases the learned discrete locations produce better results than the learned continuous locations. This is however true only before reconstruction. The loss was applied to the post-reconstruction Range-Azimuth maps, with the learned continuous locations leading to better or comparable results.

Figure 2:
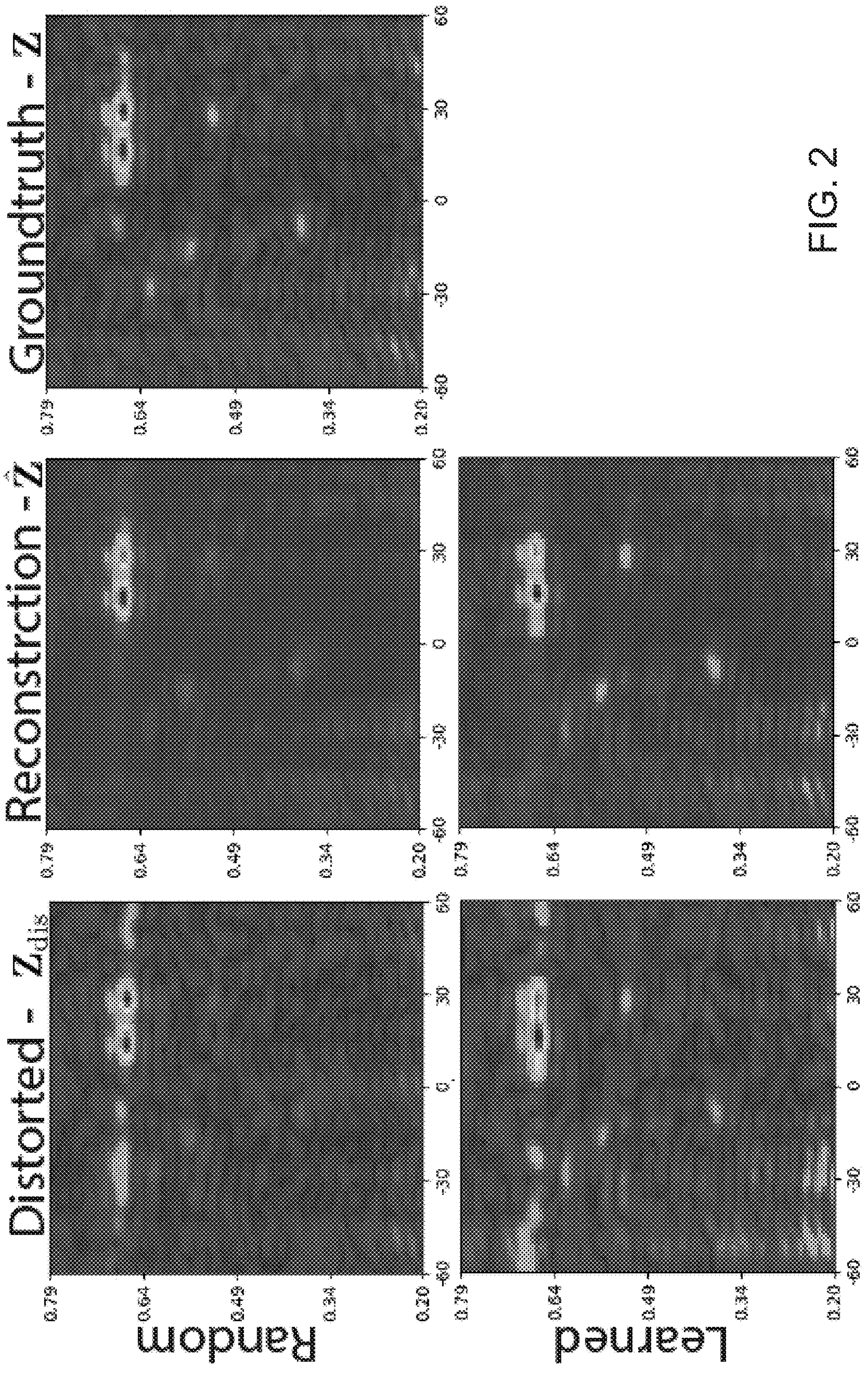
FIG. 2 shows visual comparison between Range-Azimuth maps of a random and learned channel selection in a discrete learning scenario as obtained in experiments performed according to some embodiments of the present invention using budget of $n_R$=10 Rx channels.

Visual results depicted in FIG. 2 demonstrate the role of the learned channel selection. Two strong reflectors and five weaker reflectors are located in this scene. The learned antenna selection contains data that is useful for the reconstruction network to be able to reconstruct the best Range-Azimuth map. The reconstruction of the learned selection was able to locate more targets than the random selection.

Another advantage of the learned selection of the present embodiments is its multivariate nature. The learned selection includes a collection of antennas, where each antenna is selected to deliver the best additive performance with respect to all other antenna locations. This is in contrast to random selection in which each antenna is chosen randomly.

A comparison between random, uniform and learned antenna locations is presented in FIGS. 3A and 3B.

Conclusion and Additional Features

This Example demonstrated that learning the Rx antenna locations simultaneously with a reconstruction neural model improves the end quality of a MIMO radar. The quality improvement in this Example arises from two factors which can be used independently or in concert. The first factor is the neural-network reconstruction, and its training scheme, which leads to significant improvement in the image quality. The second factor is the acquisition parameter optimization in the form of Rx antenna locations which lead to additive improvement. In cases where neural network based reconstruction is not desired, one can still use the learned acquisition parameter without using a neural network for reconstruction.

While this Example was described with a particular emphasis to the learning of Rx antenna locations together with Range-Azimuth map reconstruction, it is to be understood embodiments in which Rx and/or Tx antenna locations are learned with other downstream tasks such as detection, localization and segmentation are also contemplated. Further, the machine learning procedure of the present embodiments can also be used for learning other acquisition parameters such as, but not limited to, the transmitted waveform modulation, Doppler shift acquisition, and the like.

Appendix A: Multivariate Gumbel-Softmax Reparametrization

The conventional Gumbel-softmax reparametrization technique [16] allows to sample from discrete random variables in a differentiable manner. A similar technique allows to sample from a relaxed Bernoulli distribution, B~RelaxedBernoulli(α, λ) as follows:

$$U \sim \text{Uniform}(0, 1),$$

$$L = \log(\alpha) + \log(U) - \log(1 - U),$$

-continued $$B = \frac{1}{1 + \exp(-L/\lambda)},$$

where α is the location parameter and λ is a temperature parameter that controls the degree of approximation.

It was proposed [17] to use the Gaussian copula to characterize the correlation between multiple uniform random variables, so that their dependencies can be transferred to multiple relaxed Bernoulli variables. According to some embodiments of the present invention a learned covariance Σ is added to the sampling process. In order to keep Σ positive semi-definite, its factor L was used as the learned parameter. In order to sample ψ from this new Top K distribution (ψ~TopK( )), the following procedure was employed:

(1) Draw a standard normal sample: ε~N(0, I)

(2) Generate a multivariate Gaussian vector: g=Lε

(3) Apply element-wise Gaussian CDF$\Phi_{\sigma i}$ with mean zero and variance $\sigma i^2$, where $\sigma i = \Sigma ii = (LL^T)_{ii}$:

$$U_i = \Phi_{\sigma i}(g_i)$$

(4) Apply inverse CDF of the logistic distribution:

$$li = \log(\alpha_i) + \log(Ui) - \log(1 - U_i),$$

(5) Apply relaxed Top K operator [23]:

$$\psi = RelaxedTopK(l, n, \lambda)$$

In the above examples, λ was set, without limitation, to 0.001. Using this reparametrization, the optimization variables in EQ. 1 are replaced to obtain:

$$\min_{\alpha, L, \theta} \sum_{s,z} \ell(R_\theta(B_H(F_\psi(S))), Z)$$

Appendix B: Emulating Continuous Antenna Location Sampling

The Inventors observed that when creating a synthetic signal that would be acquired by an antenna between two actually sampled antennas, linear interpolation with weights set according to the antenna's relative position affects the SNR in a location dependent way.

Figure 4A:
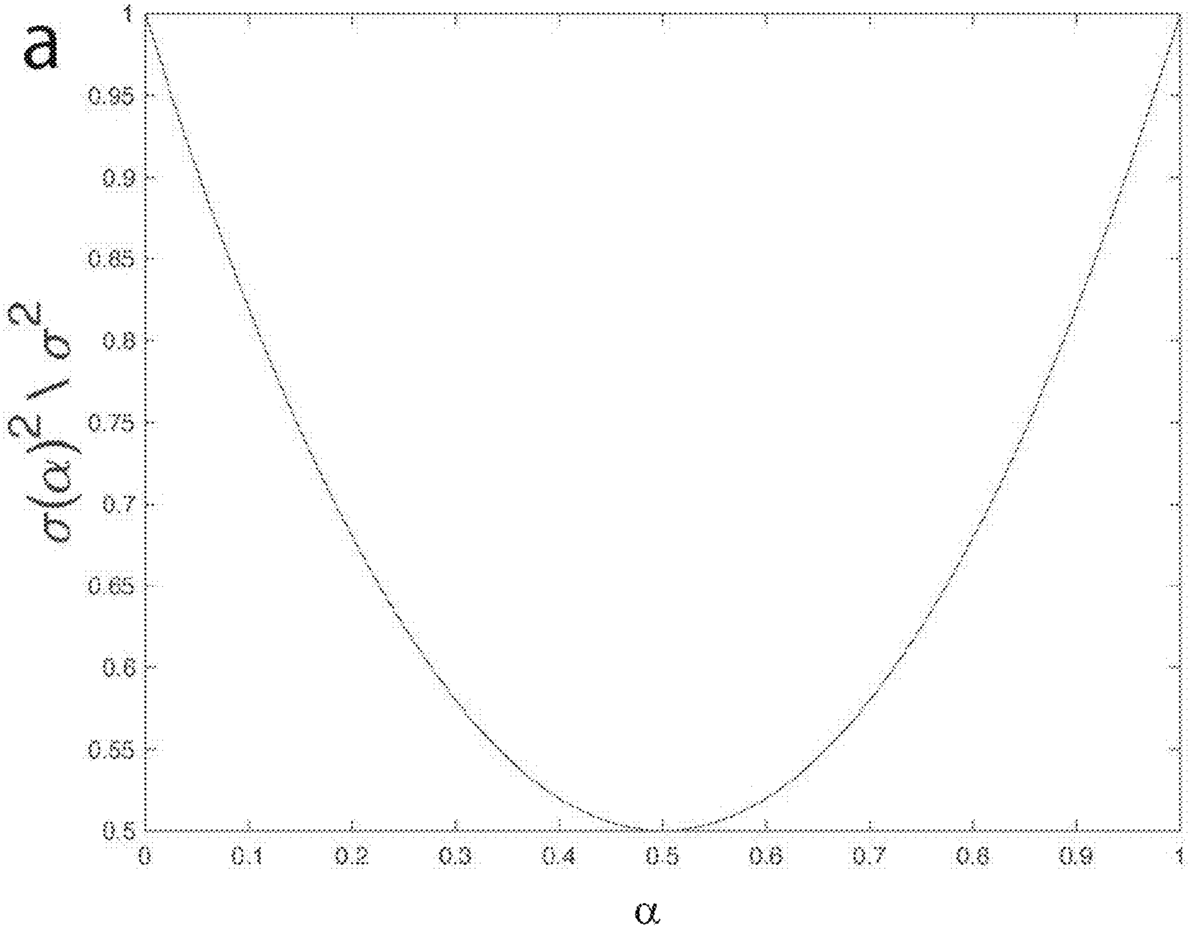
FIG. 4A shows noise reduction as function of a first interpolation weight $\alpha$ in 2 data channel interpolation, as obtained in experiments performed according to some embodiments of the present invention.

Assume that two antennas located at positions i and i+1 receive the signals $c_i$ and $c_{i+1}$, respectively. The signal received at a new antenna placed at i+α can be emulated as the linear combination $c(\alpha) = (1-\alpha)c_i + \alpha c_{i+1}$. Assuming both channels contain independent Gaussian noise with variance a $\sigma^2$, the noise level of c(α) is $\sigma(\alpha)^2 = ((1-\alpha)\sigma)^2 + (\alpha\sigma)^2 = ((1-\alpha)^2 + \alpha^2)\sigma^2$, as depicted in FIG. 4A.

When optimizing a loss that depends on c(α) with respect to α, false local minima may arise in the optimization landscape that are related only to the emulation and not to the original problem. To overcome this, the Inventors added a second acquisition of the same scene and interpolated between the two consecutive acquisitions in such a way that leads to a constant noise reduction as function of the learned coordinate.

Assuming the previous two channels to be sampled twice (at time t and t+1), four realizations are obtained, as follows:

$$c_{t,i}, c_{t,i+1}, c_{t+1,i} \text{ and } c_{t+1,i+1}.$$

A new weight β is introduced for the bilinear interpolation in space and time:

$$c(\alpha,\beta)=(1-\beta)((1-\alpha)c_{t,i}+c_{t,i+1})+\beta((1-\alpha)c_{t+1,i}+c_{t+1,i+1}).$$

Figure 4B:
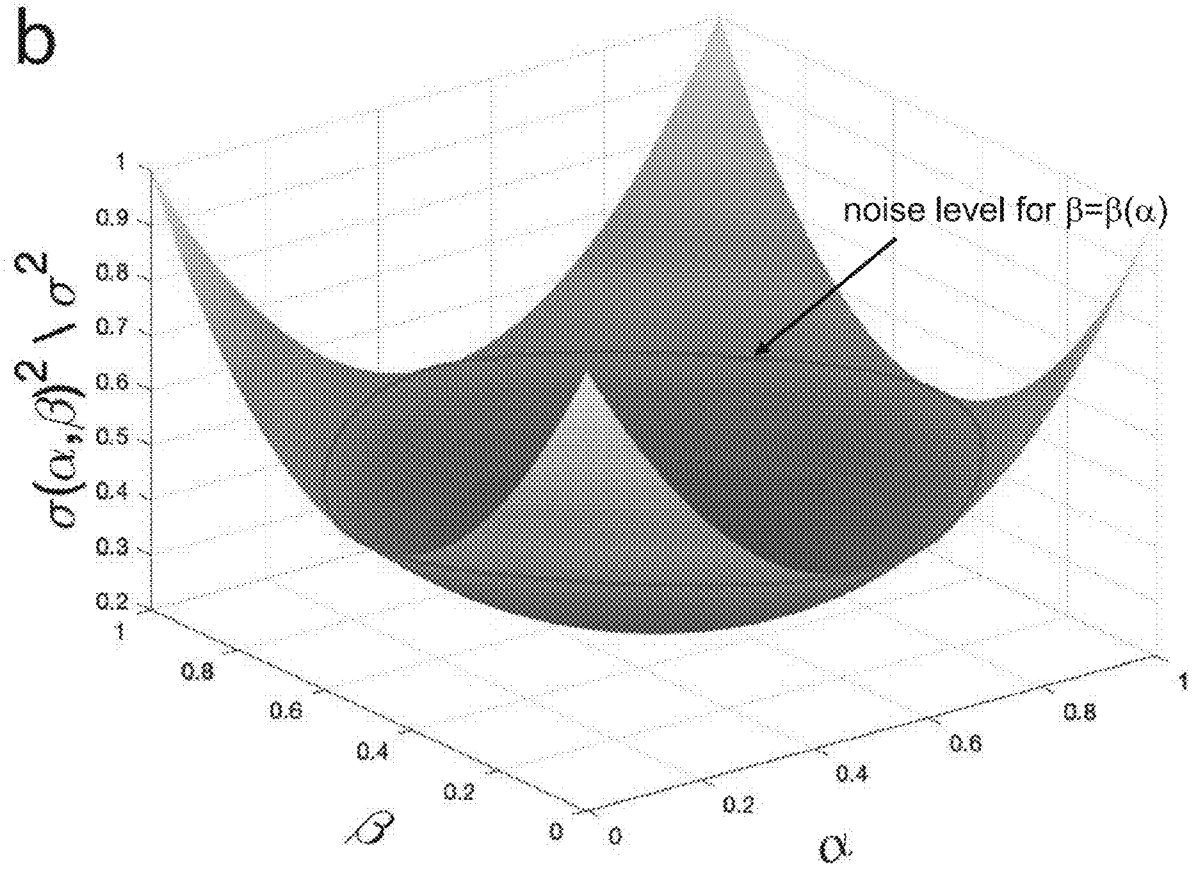
FIG. 4B shows noise reduction as function of a first $\alpha$ and a second $\beta$ interpolation weights in 4 data channel interpolation, as obtained in experiments performed according to some embodiments of the present invention. The noise level when using the function shown in FIG. 4C to determine $\beta$ according to $\alpha$ is shown as a thick line.

The noise of variance of the new synthetic channel now becomes:

$$\sigma(\alpha,\beta)^2=((1-\beta)^2+\beta^2)((1-\alpha)^2+\alpha^2)\sigma^2$$

as depicted in FIG. 4B. Setting:

$$\beta=\frac{1}{2}\left(1+\sqrt{-1+\frac{1}{2\alpha^2-2\alpha+1}}\right)$$

Figure 4C:
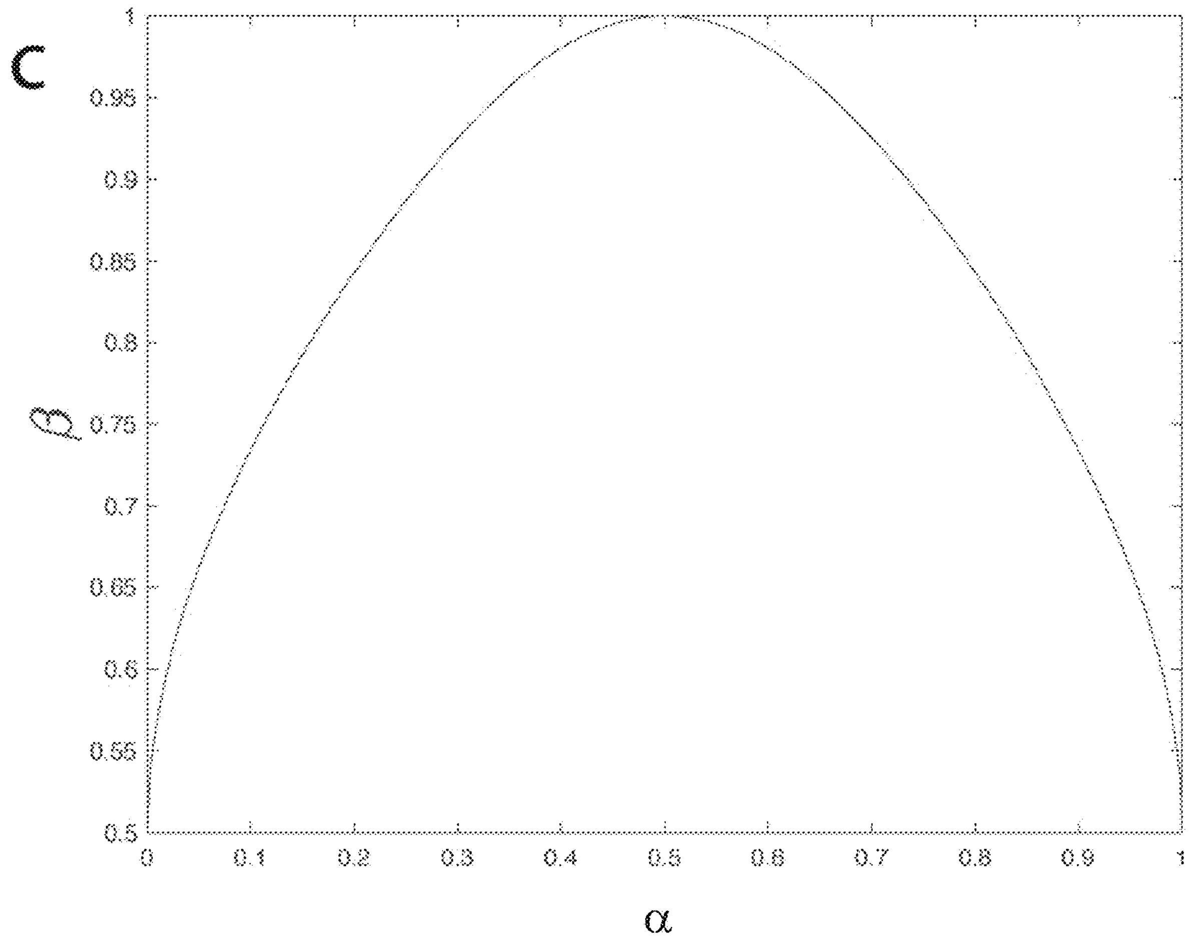
FIG. 4C shows a selection of the second interpolation weight $\beta$ as a function of the first interpolation weight $\alpha$, according to some embodiments of the present invention.

(see FIG. 4C) yields a constant SNR function $\sigma(\alpha)^2=0.5\sigma^2$, for any choice of a (red line in FIG. 4B).

The above technique is useful in any application in which a new channel is synthetically created by weighted interpolation of recorded channels.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

[1] E. Fishler, A. Haimovich, R. Blum, D. Chizhik, L. Cimini, and R. Valenzuela, "Mimo radar: an idea whose time has come," in Proc. of the IEEE Radar Conference (RadarConf), 2004.

[2] David L Donoho, "Compressed sensing," IEEE Transactions on information theory, vol. 52, no. 4, pp. 1289-1306, 2006.

[3] Thomas Strohmer and Haichao Wang, "Sparse mimo radar with random sensor arrays and kerdock codes," in Proc. IEEE Int. Conf. Sampling Theory and Applications, 2013, pp. 517-520.

[4] Thomas Strohmer and Benjamin Friedlander, "Analysis of sparse mimo radar," Applied and Computational Harmonic Analysis, vol. 37, no. 3, pp. 361-388, 2014.

[5] Yao Yu, Athina P Petropulu, and H Vincent Poor, "Mimo radar using compressive sampling," IEEE Journal of Selected Topics in Signal Processing, vol. 4, no. 1, pp. 146-163, 2010.

[6] Marco Rossi, Alexander M Haimovich, and Yonina C Eldar, "Spatial compressive sensing for mimo radar," IEEE Transactions on Signal Processing, vol. 62, no. 2, pp. 419-430, 2013.

[7] Puyang Wang and Vishal M Patel, "Generating high quality visible images from sar images using cnns," in IEEE Radar Conference (RadarConf), 2018.

[8] Junfeng Guan, Sohrab Madani, Suraj Jog, and Haitham Hassanieh, "High resolution millimeter wave imaging for self-driving cars," arXiv preprint arXiv:1912.09579, 2019.

[9] Ahmet M Elbir, Satish Mulleti, Regev Cohen, Rong Fu, and Yonina C Eldar, "Deep-sparse array cognitive radar," in 2019 13th Int'l Conf. on Sampling Theory and Applications (SampTA). IEEE, 2019.

[10] Ahmet M Elbir and Kumar Vijay Mishra, "Sparse array selection across arbitrary sensor geometries with deep transfer learning," IEEE Transactions on Cognitive Communications and Networking, 2020.

[11] Harel Haim, Shay Elmalem, Raja Giryes, Alex M Bronstein, and Emanuel Marom, "Depth estimation from a single image using deep learned phase coded mask," IEEE Transactions on Computational Imaging, vol. 4, no. 3, pp. 298-310, 2018.

[12] Sanketh Vedula, Ortal Senouf, Grigoriy Zurakhov, Alex Bronstein, Oleg Michailovich, and Michael Zibulevsky, "Learning beamforming in ultrasound imaging," Proc. Medical Imaging with Deep Learning (MIDL), 2019.

[13] Tomer Weiss, Ortal Senouf, Sanketh Vedula, Oleg Michailovich, Michael Zibulevsky, and Alex Bronstein, "Pilot: Physics-informed learned optimized trajectories for accelerated mri," Journal of Machine Learning for Biomedical Imaging (MELBA), 2021.

[14] Tomer Weiss, Sanketh Vedula, Ortal Senouf, Oleg Michailovich, et al., "Towards learned optimal q-space sampling in diffusion mri," Proc. Computational Diffusion MRI, MICCAI, 2020.

[15] Tomer Weiss, Sanketh Vedula, Ortal Senouf, Oleg Michailovich, Michael Zibulevsky, and Alex Bronstein, "Joint learning of cartesian under sampling andre construction for accelerated mri," in International Conference on Acoustics, Speech and Signal Processing (ICASSP). IEEE, 2020.

[16] Eric Jang, Shixiang Gu, and Ben Poole, "Categorical reparameterization with gumbel-softmax," arXiv preprint arXiv: 1611.01144, 2016.

[17] Xi Wang and Junming Yin, "Relaxed multivariate bernoulli distribution and its applications to deep generative models," in Conference on Uncertainty in Artificial Intelligence. PMLR, 2020, pp. 500-509.

[18] Olaf Ronneberger, Philipp Fischer, and Thomas Brox, "U-net: Convolutional networks for biomedical image segmentation," in MICCAI, 2015.

[19] Jure Zbontar, Florian Knoll, and Anuroop et al. Sriram, "fastMRL An open dataset and benchmarks for accelerated MRI," arXiv preprint arXiv:1811.08839, 2018.

[20] Michael Stephan and Avik Santra, "Radar-based human target detection using deep residual u-net for smart home applications," in 18th IEEE International Conference on Machine Learning And Applications, 2019.

[21] Longhao Xie, Qing Zhao, Chunguang Ma, Binbin Liao, and Jianjian Huo, "U-Net: Deep-Learning Schemes for Ground Penetrating Radar Data Inversion," Journal of Environmental and Engineering Geophysics, 2020.

[22] Diederik P. Kingma and Jimmy Ba, "Adam: A method for stochastic optimization," 2017.

[23] Sang Michael Xie and Stefano Ermon, "Reparameterizable subset sampling via continuous relaxations," arXiv preprint arXiv:1901.10517, 2019.

What is claimed is:

1. A method of designing a radar, comprising:

receiving data pertaining to a set of reflected signals received from a distribution of objects by a respective set of receiving antennas at a respective set of locations;

feeding said data and said locations as training data to a machine learning procedure simultaneously calculating a set of learned antenna locations and a set of learned parameters associating said signals with said objects, to provide a trained machine learning procedure parametrized by said set of learned parameters; and storing in a non-transitory computer readable medium, said set of learned antenna locations separately from said trained machine learning procedure.

2. The method according to claim 1, wherein a number of learned antenna locations is less than a number of said receiving antennas.

3. The method according to claim 2, wherein said set of learned antenna locations is a subset of said respective set of locations.

4. The method according to claim 2, wherein said set of learned antenna locations comprises at least one learned antenna location that is not a member of said respective set of locations.

5. The method according to claim 1, wherein said set of learned parameters comprises parameters employed by said trained machine learning procedure to reconstruct a scene containing said objects.

6. The method according to claim 1, wherein said set of learned parameters comprises parameters employed by said trained machine learning procedure to reconstruct an image of a scene containing said objects.

7. The method according to claim 1, wherein said set of learned parameters comprises parameters employed by said trained machine learning procedure to detect presence of said objects.

8. The method according to claim 1, wherein said set of learned parameters comprises parameters employed by said trained machine learning procedure to determine locations of said objects.

9. The method according to claim 1, wherein said set of learned parameters comprises parameters employed by said trained machine learning procedure to segment of a scene containing said objects.

10. The method according to claim 1, wherein said machine learning procedure comprises a sub-sampling layer, wherein said learned antenna locations are parameters of said sub-sampling layer, and wherein said trained machine learning procedure is devoid of said sub-sampling layer.

11. The method according to claim 1, wherein said machine learning procedure comprises a beamforming layer having fixed parameters.

12. The method according to claim 1, comprising training said machine learning procedure to learn at least one acquisition parameter.

13. The method according to claim 12, wherein said at least one acquisition parameter is selected from the group consisting of transmitted waveform modulation, and Doppler shift acquisition.

14. A method of constructing a radar, the method comprising:

executing the method according to claim 1; and constructing an array of receiving antennas at said set of learned antenna locations, and an array of transmitting antennas at predetermined locations;

thereby constructing the radar.

15. A method of analyzing a scene, the method comprising:

receiving signals from the scene using a radar designed according to claim 1;

feeding said signals to said trained machine learning procedure; and receiving from said trained machine learning procedure output pertaining to an association of said signals with objects in the scene.

16. A method of designing a radar, comprising:

receiving data pertaining to reflected signals received from a distribution of objects in response to signals transmitted by a set of transmitting antennas at a respective set of locations;

feeding said data and said locations as training data to a machine learning procedure simultaneously calculating a set of learned antenna locations and a set of learned parameters associating said signals with said objects, to provide a trained machine learning procedure parametrized by said set of learned parameters; and storing in a non-transitory computer readable medium, said set of learned antenna locations separately from said trained machine learning procedure.

17. A radar system, comprising at least one transmitting antenna for transmitting a signal to a distribution of objects in a scene;

a set of receiving antennas distributed non-uniformly over a surface for receiving a respective set of reflected signals from said objects; and a data processor configured to receive data pertaining to said reflected signals, to feed said data to a trained machine learning procedure which is specific to said non-uniform distribution, and to receive from an output layer of said trained machine learning procedure a reconstruction of said scene.

18. The system according to claim 17, comprising a plurality of transmitting antennas for transmitting a respective plurality of signals to said distribution of object.

19. The system according to claim 18, wherein said plurality of transmitting antennas are also distributed non-uniformly.

20. A radar system, comprising a set of transmitting antennas distributed non-uniformly over a surface for transmitting a respective set of signals to a distribution of objects in a scene;

at least one receiving antenna for receiving a respective at least one reflected signal from said objects; and a data processor configured to receive data pertaining to said at least one reflected signal, to feed said data to a trained machine learning procedure which is specific to said non-uniform distribution, and to receive from an output layer of said trained machine learning procedure a reconstruction of said scene.

* * * * *